United States Patent
Abler et al.

[15] 3,669,892
[45] June 13, 1972

[54] AEROSOL SPRAY CLEANER-POLISH

[72] Inventors: Roger L. Abler, White Bear Lake; David L. Strand, Maplewood, both of Minn.

[73] Assignee: Minnesota Mining and Manufacturing Company, St. Paul, Minn.

[22] Filed: Jan. 29, 1969

[21] Appl. No.: 795,081

[52] U.S. Cl. ..................................252/90, 106/3, 134/34, 252/307
[51] Int. Cl. ...........................................C11d 17/00
[58] Field of Search ..................252/90, 89, 305, 307; 106/3, 106/10; 222/394; 260/29.6; 134/2, 34, 40

[56] References Cited

UNITED STATES PATENTS

| | | | |
|---|---|---|---|
| 2,524,590 | 10/1950 | Boe | 252/305 |
| 2,995,278 | 8/1961 | Clapp | 252/305 |
| 3,163,547 | 12/1964 | Vietor | 106/10 |
| 3,222,201 | 12/1965 | Boyle et al. | 106/3 |
| 3,326,807 | 6/1967 | Guest et al. | 252/89 |

*Primary Examiner*—Leon D. Rosdol
*Assistant Examiner*—W. Schulz
*Attorney*—Kinney, Alexander, Sell, Steldt & Delahunt

[57] ABSTRACT

An aerosol spray cleaner-polish composition having improved gloss and rebuff characteristics which provides a dry readily visible non-plugging foam. At least about 18 parts by weight of certain compatible detergents per 100 parts of non-volatile solids are included in aerosol floor cleaning and polishing compositions of the type comprising aqueous styrene and/or acrylic film forming polymer emulsions.

4 Claims, No Drawings

AEROSOL SPRAY CLEANER-POLISH

BACKGROUND OF THE INVENTION

This invention relates to improved aerosol spray cleaner-polish compositions for cleaning and polishing coated hard surface floors.

The advent of long-wearing synthetic floor polishes provided a need for compositions to rapidly clean, repair, and restore the gloss of the synthetic floor coating. Such cleaner-polish compositions are typically applied to the floor surface, subsequently dried, and polished by means of a lofty, fibrous, low-density, floor cleaning pad driven by a conventional floor cleaning and polishing machine.

Spray cleaner-polish compositions are known in the art and typically comprise aqueous styrene and/or acrylic polymer emulsions having a non-volatile solids content from about 5 to about 40 percent, and a pH of about 8.5 to about 10. These polymer emulsions primarily contain at least one emulsified acrylate polymer or copolymer, acrylic polymer or copolymer, styrene polymer or styrene-acrylic copolymer. Additional ingredients are typically alkali soluble resins as leveling aids to provide effective wetting of the floor surface and emulsified waxes or emulsified polyolefins or both. Plasticizers and film forming aids are included to lower the film forming temperature of the polymer and aid in providing a continuous polymer coating. The polymer emulsion itself can readily be prepared or can be purchased on the commercial market from numerous suppliers. The emulsified polymers and waxes generally contain on the order of about 5 to about 15 parts of surfactant emulsifier per 100 parts of non-volatile solids. Small amounts of additional wetting agents are added to provide adequate floor wettability, the trade literature indicating that use of substantially more than about 5 percent wetting agent (based on non-volatile solids) causes the polish to become "tacky" and retain dirt and to be sensitive to water.

For convenience in use, cleaner-polish compositions have been adapted for use in spray dispensers such as paint and garden sprayers and various pressurized devices mounted on the floor cleaning machine itself; see, e.g., U.S. Pat. Nos. 3,058,136 and 3,055,031. The simplest method of application would seem to be to dispense a cleaner-polish composition from an aerosol spray container mounted on the machine near the floor surface; however, numerous problems have been encountered in dispensing cleaner-polish compositions from aerosol containers. These difficulties include settling and separation of the composition within the container which causes delivery of "wet foams" which are bubbly transparent liquids that cannot be rapidly dried and polished, and which are not readily visible on the floor surface, as well as causing plugging of the spray nozzle orifice. These difficulties are primarily a result of the propellant not being soluble in or miscible with the polymer emulsion.

Thus, despite the long-recognized desirability of a stable, non-settling, non-plugging aerosol spray-cleaner composition having improved gloss and rebuff characteristics and which would provide a dry readily visible foam, such a product has never heretofore existed.

SUMMARY

This invention provides an improved aerosol spray cleaner-polish composition having improved gloss and rebuff characteristics and which provides a dry visible foam dispensable from an aerosol container at effective delivery rates, without plugging of the spray nozzle orifice, without settling and separation of the composition, without causing water spotting on the floor surface, and without increasing the water sensitivity of the floor coating.

In accordance with the invention, at least about 18 parts, preferably about 20 to about 40 parts, by weight of specific types of compatible detergent per 100 parts of non-volatile solids is included in aerosol floor cleaner-polish compositions of the type comprising aqueous film forming styrene and/or acrylic polymer emulsions having a non-volatile solids content of about 5 to about 40 percent and a pH of about 8.5 to about 10. These detergents are included in addition to emulsifiers and surfactants present in the polymer emulsion and are not of the type generally used for emulsifying. These detergents are selected from the group consisting of water soluble ethoxylated alkyl phenols ethoxylated with up to about 16 ethylene oxide units, water soluble $C_{10}$ to $C_{18}$ ethoxylated aliphatic alcohols ethoxylated with up to about 16 ethylene oxide units, and alkyl benzene sulfonates wherein the alkyl group contains 10 to 15 carbon atoms.

The aerosol package used with the cleaner-polish compositions of this invention generally comprises a pressure-tight container having a typical aerosol dispensing valve which controls flow through a discharge conduit leading to the base of the container. A preferred container which helps provide a dry, visible, foam composition that spreads evenly over a floor surface without forming rings or puddles, utilizes a dispensing valve having a vapor phase hole therein. This valve also permits the cleaner-polish to be dispensed when the container is in either upright or inverted position.

The propellant utilized with aerosol cleaner-polish compositions must not react with the cleaner-polish constituents to render them ineffective or cause the propellant to hydrolyze or otherwise decompose and lose its effectiveness as a propellant. The propellant, which is employed in the amount of from 4 to about 20 percent of the contents of the container, preferably from about 5 to about 10 percent, is propane, butane, isobutane, or mixtures thereof, with isobutane being preferred because of its ideal vapor pressure over a wide range of temperatures.

Anionic detergents useful in this invention are water soluble alkyl benzene sulfonates wherein the alkyl group contains about 10 to about 15 carbon atoms. Commercial examples of these detergents include "Nacconol" 35-S-L, "Bio Soft" D-60, and "Calsoft" LAS-99. Useful nonionic detergents are $C_{10} - C_{20}$ aliphatic alcohols water-solubilized by ethoxylation with up to about 16 ethylene oxide units, and alkyl phenols water-solubilized by ethoxylation with up to about 16 ethylene oxide units, both of these classes of detergents having a hydrophile-lipophile balance (HLB) of about 7.5 to about 16 as determined by the procedure set forth in the Atlas HLB System, third edition, Atlas Chemical Industries, Inc., Chemicals Division, Wilmington, Delaware, 19899. Commercial examples of suitable ethoxylated aliphatic alcohols include "Tergitol" 15-S-3, 15-S-9, 15-S-13, "Bio Soft" EA-8 and "Lipal" 7LA. Commercial examples of suitable ethoxylated alkyl phenols include "Tergitol" NP-14, NP-27, NP-35, 12-P-6, and 12-P-12, and "Igepal" CO-630 and CO-730. These detergents are readily incorporated in the cleaner-polish by mere stirring.

A "compatible" surfactant effective in this invention is one which is soluble in the water phase of the aqueous polymer emulsion and which causes mutual solubility of the emulsion and hydrocarbon propellant. This mutual solubility of emulsion and propellant is such that no phase separation begins to appear for at least 5 minutes after mixing of the components. This system is sufficiently stable to obviate any need for shaking the aerosol container for at least 8 hours, virtually eliminates the possibility of dispensing low foam non-visible cleaner-polish, and assures that the aerosol nozzle orifice will not plug up. Upon opening the dispensing valve of the aerosol container the polymer emulsion emerges with propellant dissolved therein to provide a dry visible foam which evenly covers the floor area and enables the operator to see precisely where he has applied cleaner-polish. The dry foam can be buffed immediately, it not being necessary to wait for drying to occur.

This improved spray cleaner-polish composition is utilized when a floor coating becomes roughened, dirty, and/or scratched, and its gloss value reduced. The composition is sprayed onto the dirty floor coating and immediately buffed, while wet, with a lofty, fibrous, low-density floor cleaning pad or other similar buffing pad, driven by a conventional floor cleaning and polishing machine. The buffing removes the dirt, repairs the scratched floor coating, and restores its gloss. This cleaner-polish composition restores the original gloss of the floor coating and usually improves it, while providing high resistance to scuffing and scratching.

The following examples, in which all parts are by weight unless otherwise noted, illustrate preparation of the improved aerosol spray cleaner-polish compositions of this invention without limiting the scope thereof.

DESCRIPTION OF PREFERRED EMBODIMENTS

EXAMPLES 1 – 12

These examples illustrate the variety of detergents which can be utilized in improving aerosol spray cleaner-polish compositions and also illustrate the typical quantities of detergents which are operable. A typical aerosol floor cleaner-polish composition was prepared as control No. 1 with various amounts of suitable detergent being added to individual samples of the control, in accordance with the invention, as shown in Table I.

The control was prepared by combining 157.6 parts of de-ionized water with 33.5 parts of zinc cross-linked modified acrylic copolymer (Rhoplex B-336, Rohm and Haas Company), 1 part of tributyoxy ethyl phosphate, and 2 parts of methyl carbitol while maintaining agitation throughout. A polyethylene copolymer emulsion was separately prepared by combining 20.74 parts of ethylene-organic acid copolymer ("A-C Copolymer 540", Allied Chemical Co.) having a molecular weight of about 3,000 and an acid number of 40, with 3.62 parts of tall oil fatty acid ("Actinol FA-3," Arizona Chemical Co.), and heating to 230°–240° F. Next, 0.974 parts of 45 percent KOH and 3.629 parts of morpholine were added with stirring for 30 minutes and the temperature raised to 245° F. The hot mixture was added, with agitation, to 71.03 parts of de-ionized water at 203°–208° F. and the mixture cooled to 75° F. Then, 18 parts of the polyethylene copolymer emulsion was added to the acrylic copolymer emulsion, with stirring. Sufficient concentrated (28 percent) ammonium hydroxide was added to adjust the pH to about 9.5.

TESTING PROCEDURE

The excellent mutual emulsion-propellant solubility provided by the addition of detergents in accordance with this invention was demonstrated by placing 80 gms. of the emulsion of each example in a 4 ounce vinyl coated glass aerosol bottle, an aerosol valve crimped on the bottle, 8 gms. of isobutane introduced, and the bottles vigorously shaken. The amount of time required for slight phase separation (i.e., the appearance of a visible band intermediate the top and bottom of the liquid phase) was determined for each sample.

The addition of various detergents in accordance with the invention provided solvent-polymer emulsion compositions at least 10 times more stable than the control cleaner-polish, the test data being illustrated in Table II. Each of the cleaner-polish compositions of these examples was sprayed on a floor surface, each providing a dry visible foam which was easily and rapidly buffed, while wet, with a lofty, low density, fibrous, floor cleaning pad driven by a conventional floor cleaning and polishing machine. Each composition provided a high gloss floor surface, did not require shaking for at least 8 hours, and did not plug the nozzle orifice. The control was found to dispense a wet foam which was not readily visible and did not provide as high a floor gloss as those compositions containing detergent.

Each cleaner-polish composition was evaluated to determine its initial gloss when buffed, gloss after being scuffed, gloss after being re-buffed, and the gloss after being re-buffed with an additional application of cleaner-polish. The test machine was a Schiefer test machine as described in Section 4.3.2.1 of Interim Federal Specification No. 00-P-0040b (G-SA-FSS) dated July 15, 1963.

A 4-inch polishing pad disc ("SCOTCH-BRITE" Brand Super Polish Pad, 3M Company) and a 4-inch disc of white vinyl asbestos floor tile from which all surface finish had been removed, were installed on the test machine. The machine was started and 3 drops of cleaner-polish placed on the tile every 150 revolutions for a total of 1,500 revolutions (30 drops total). The tile was buffed for an additional 500 revolutions and the gloss determined with 60° Glossmeter per ASTM D-1455, results being reported in Column 1 of Table III. These values indicate that the cleaner-polishes of this invention have a higher initial gloss than the control which is itself considered to have good gloss. The coated tile was then abraded with a 4-inch abrasive pad disc (Type S Ultrafine "-SCOTCH-BRITE" Brand Cleaning and Finishing Material, 3M Company), for 100 revolutions. The gloss was again determined and is reported in Column 2 of Table III. This gloss value is an indication of the gloss a floor polish would have after being exposed to scuffing and wearing for a period of time. The tile was then buffed for 20 revolutions using a polishing pad ("SCOTCH-BRITE" Brand Super Polish Pad, 3M Company) and the gloss again measured (Column 3 of Table III) to determine how well the polish recovers its gloss by simple buffing. Three drops of cleaner-polish were applied and the tile again buffed for 200 revolutions with the polishing pad and gloss measured (Column 4 of Table III). This figure provides an indication of the gloss obtainable by lightly applying cleaner-polish to a scuffed floor and buffing it. The final gloss values obtained by use of the cleaner-polishes of this invention exceeded the gloss values obtained by use of a prior art cleaner-polish (e.g., the control) and are considered to be excellent, in most instances equaling or exceeding initial gloss before scuffing.

The cleaner-polishes of this invention do not harm the moisture resistance of floor polishes and waxes, and have outstanding durability together with long life, as demonstrated by floor service tests. Four coats of commercially available floor finish ("Step Ahead" floor finish, S. C. Johnson & Son, Inc.) were coated on white vinyl asbestos tiles according to the manufacturer's recommendations on the container. These coated test tiles were installed on the floor of a hallway subject to a traffic count of about 450–500 persons per day. One set of tiles was maintained with the cleaner-polish of Example 1 dispensed from an aerosol container at the rate of about 0.44 gm. per square foot and buffed to dryness with a 16-inch rotary floor polishing machine fitted with a buffer pad ("-SCOTCH-BRITE" Brand Red Buffer pad). Another set of test tiles was maintained as per the wax manufacturer's specifications and instructions by dry mopping, damp mopping, and buffing. Gloss was measured on each set of tiles at varying intervals per ASTM D-1455, the results being recorded in Table IV. Initial gloss of tiles maintained with cleaner-polish was much better than that obtained by conventional maintenance of the floor coating.

The excellent gloss retention of the cleaner-polishes of this invention for extended periods of time was demonstrated by applying four coats of floor finish (formulation N-17-38, Rohm and Haas Co.) to vinyl asbestos test tiles with a cotton cloth. The cleaner-polish composition of Example 1 in an aerosol container and a 16-inch rotary floor cleaning machine fitted with a buffer pad ("SCOTCH-BRITE" Brand Red Buffer Pad) were used to maintain and polish the test tiles.

Gloss was measured each week for a period of 8 weeks, the high level of gloss retention, the results of which are recorded in Table V, being considered excellent.

EXAMPLES 13 – 14

These examples illustrate the effectiveness of this invention when different polyethylene copolymer emulsions are used, in varying amounts, in the spray cleaner-polish.

A polyethylene copolymer emulsion was prepared by adding 14 parts of polyethylene-organic acid copolymer ("A-C Copolymer 540," Allied Chemical Co.,) 0.778 parts of 45 percent KOH, and 40.8 parts of de-ionized water to a pressure reactor fitted with a stirrer and heating to 95° C. at which time the vent valve was closed. The mixture was then heated with stirring to 135° C., maintained for 30 minutes, and cooled to room temperature.

The spray cleaner-polish formulations of these two Examples and Control No. 2 were prepared as in Example 1, using the above polyethylene copolymer emulsion, the acrylic copolymer emulsion of Example 1, and the detergent shown in Table I. Initial gloss, gloss after scuffing, gloss after rebuffing, and gloss after rebuffing with additional cleaner-polish were determined in the manner of Examples 1, the results being shown in Table III. In all instances, the initial gloss of compositions containing detergent in accordance with the invention was significantly higher than the initial gloss of the control. When the test tiles were rebuffed, with application of additional cleaner, the gloss in all instances was greater than that obtained by the control.

EXAMPLES 15 – 17

These examples illustrate use of other polymer emulsions in the spray cleaner-polishes of this invention. The cleaner-polish emulsions were prepared as in Example 1, except that other polymer emulsions were substituted for the acrylic copolymer of Example 1 in accordance with the formulations shown in Table I. Example 15 utilizes an acrylic copolymer; Example 16, a metal complexed acrylate copolymer; Example 17, an acrylate copolymer. Each cleaner-polish formulation was tested in accordance with the procedures used in Examples 1–13, the test data being reported in Table III. The addition of detergent, in accordance with the invention, provided improved gloss which was better than that obtained with the control formulations.

TABLE III

| Example | Buffed(1) | 60°— Gloss Scuffed(2) | Rebuffed(3) | Rebuffed with cleaner-polish(4) |
|---|---|---|---|---|
| control 1 | 45 | 19 | 34 | 44 |
| 1 | 64 | 4 | 33 | 61 |
| 2 | 70 | 4 | 57 | 65 |
| 3 | 57 | 4 | 39 | 63 |
| 4 | 50 | 14 | 29 | 62 |
| 5 | 55 | 4 | 31 | 59 |
| 6 | 55 | 8 | 45 | 60 |
| 7 | 68 | 4 | 43 | 57 |
| 8 | 60 | 4 | 45 | 62 |
| 9 | 53 | 17 | 35 | 52 |
| 10 | 57 | 5 | 36 | 57 |
| 11 | 68 | 7 | 31 | 61 |
| 12 | 74 | 6 | 41 | 66 |
| control 2 | 27 | 11 | 32 | 35 |
| 13 | 53 | 16 | 36 | 52 |
| 14 | 57 | 18 | 33 | 49 |
| 15 | 48  66 | 4 | 48 | 71 |
| 16 | 74 | 6 | 38 | 65 |
| 17 | 69 | 7 | 31 | 64 |

TABLE I

| Example | De-ionized water | Emulsion polymer | Polyethylene emulsion | Tributoxy phosphate | Methyl carbitol | Parts detergent/100 parts emulsion non-volatiles | Detergent |
|---|---|---|---|---|---|---|---|
| Control No. 1 | 157.6 | 33.5 | 18 | 1 | 2 | — | — |
| 1 | 157.6 | 33.5 | 18 | 1 | 2 | 23.3 | sec-Pentadecanoxy-octaethyleneoxy ethanol.[1] |
| 2 | 157.6 | 33.5 | 18 | 1 | 2 | 44.6 | Do. |
| 3 | 157.6 | 33.5 | 18 | 1 | 2 | 23.3 | Nonylphenoxy-triethyleneoxy ethanol.[2] |
| 4 | 157.6 | 33.5 | 18 | 1 | 2 | 23.3 | Dodecylbenzene sodium sulfonate.[3] |
| 5 | 157.6 | 33.5 | 18 | 1 | 2 | 23.3 | Nonylphenoxy-hexaethyleneoxy ethanol.[4] |
| 6 | 157.6 | 33.5 | 18 | 1 | 2 | 23.3 | sec-Pentadecanoxy-diethyleneoxy ethanol.[5] |
| 7 | 157.6 | 33.5 | 18 | 1 | 2 | 23.3 | sec-Pentadecanoxy-undecaethyleneoxy ethanol.[6] |
| 8 | 157.6 | 33.5 | 18 | 1 | 2 | 23.3 | Nonylphenoxy-tetradecaethyleneoxy ethanol.[7] |
| 9 | 157.6 | 33.5 | 18 | 1 | 2 | 23.3 | Dodecylphenoxy-pentaethyleneoxy ethanol.[8] |
| 10 | 157.6 | 33.5 | 18 | 1 | 2 | 23.3 | Nonylphenoxy-tetradecaethyleneoxy ethanol.[9] |
| 11 | 157.6 | 33.5 | 18 | 1 | 2 | 23.3 | Nonylphenoxy-nonaethyleneoxy ethanol.[10] |
| 12 | 157.6 | 33.5 | 18 | 1 | 2 | 23.3 | Dodecylphenoxy-undecaethylene ethanol.[11] |
| Control No. 2 | 163 | 33.5 | 5.2 | 1 | 2 | — | — |
| 13 | 163 | 33.5 | 5.2 | 1 | 2 | 26.7 | sec-Pentadecanoxy-octaethyleneoxy ethanol.[1] |
| 14 | 163 | 33.5 | 5.2 | 1 | 2 | 13.3 | Do. |
| 15 | 157.6 | [12] 33.5 | 18 | 1 | 2 | 23.3 | Do. |
| 16 | 157.6 | [13] 33.5 | 18 | 1 | 2 | 23.3 | Do. |
| 17 | 157.6 | [14] 33.5 | 18 | 1 | 2 | 23.3 | Do. |

[1] "Tergitol" 15-S-9, Union Carbide Corporation.
[2] "Tergitol" NP-14, Union Carbide Corporation.
[3] "Nacconol" 35 SL, Allied Chemical Company.
[4] "Tergitol" NP-27, Union Carbide Corporation.
[5] "Tergitol" 15-S-3, Union Carbide Corporation.
[6] "Tergitol" 15-S-12, Union Carbide Corporation.
[7] "Tergitol" NP-35, Union Carbide Corporation.
[8] "Tergitol" 12-P-6, Union Carbide Corporation.
[9] "Igepal" CO 730, Antara Chemicals Div. of General Aniline & Film Corporation.
[10] "Igepal" CO 630, Antara Chemicals Div. of General Aniline & Film Corporation.
[11] "Tergitol" 12-P-12, Union Carbide Corporation.
[12] "Neo-Cryl" BR-280, Polyvinyl Chemicals, Inc.
[13] "Polymer" 1244, Interpolymer Corporation.
[14] "Polymer" 1065, Interpolymer Corporation.

TABLE II

| Example | Time To Show Any Phase Separation |
|---|---|
| Control No. 1 | 0.5 Minutes |
| 1 | 12 |
| 2 | 17 |
| 3 | 6 |
| 4 | 15 |
| 5 | 7 |
| 6 | 40 |
| 7 | 8 |
| 8 | 8 |
| 9 | 17 |
| 10 | 8 |
| 11 | 10 |
| 12 | 9 |

TABLE IV

| Test Interval | 60°Gloss With cleaner-polish | Conventional Mntce. |
|---|---|---|
| Initial (before traffic) | 45 | 30 |
| after 1 day's traffic | 40 | 31 |
| after 3 day's traffic | 43 | 30 |
| after 5 day's traffic | 44 | 40 |
| after 10 day's traffic | 38 | 29 |
| after 15 day's traffic | 40 | 26 |

TABLE V

| Week | Gloss-60° |
|---|---|
| 0 | 77 |
| 1 | 77 |
| 2 | 74 |
| 3 | 75 |
| 4 | 77 |
| 5 | 70 |

What is claimed is:

1. An aerosol spray cleaner-polish composition consisting essentially of an aerosol container containing aqueous styrene and/or acrylic film-forming polymer emulsion having a nonvolatile solid content of about 5 to about 40 percent and a pH of about 8.5 to about 10, about 5 to about 15 parts by weight of surfactant emulsifier per 100 parts of nonvolatile solids, about 4 to about 20 parts liquefied normally gaseous hydrocarbon aerosol propellant, about 18 to about 45 parts by weight of compatible water-soluble detergent per 100 parts of nonvolatile solids, said detergent being selected from the group consisting of alkyl benzene sulfonates wherein the alkyl group contains about 10 to about 15 carbon atoms, $C_{10}$–$C_{20}$ aliphatic alcohols water-solubilized by ethoxylation with up to about 16 ethylene oxide units, and alkyl phenols water-solubilized by ethoxylation with up to about 16 ethylene oxide units, whereby said composition is non-plugging, nonsettling, dry foaming and imparts improved gloss to polish coated floors without harming the moisture resistance thereof.

2. The aerosol spray cleaner-polish composition of claim 1 wherein said detergent is a $C_{10}$ – $C_{20}$ aliphatic alcohol water-solubilized by ethoxylation with up to about 16 ethylene oxide units.

3. The aerosol spray cleaner-polish composition of claim 2 wherein said detergent is sec-pentadecanoxy-octaethyleneoxy ethanol.

4. The aerosol spray cleaner-polish composition of claim 1 wherein said detergent is nonylphenoxy-triethyleneoxy ethanol.

* * * * *